Jan. 29, 1963    J. D. SKELTON ETAL    3,076,175
GEOPHYSICAL EXPLORATION
Filed April 10, 1956    5 Sheets-Sheet 1

Jesse D. Skelton
Philip S. Williams    Inventors
John T. Baker

By W.O. Heilman  Attorney

Jan. 29, 1963  J. D. SKELTON ET AL  3,076,175
GEOPHYSICAL EXPLORATION
Filed April 10, 1956  5 Sheets-Sheet 2

Jesse D. Skelton
Philip S. Williams
John T. Baker
Inventors

By W. D. Heilman  Attorney

Jan. 29, 1963   J. D. SKELTON ETAL   3,076,175
GEOPHYSICAL EXPLORATION
Filed April 10, 1956                                         5 Sheets-Sheet 3

Jesse D. Skelton
Philip S. Williams      Inventors
John T. Baker

By W.O. Heilman Attorney

Jan. 29, 1963   J. D. SKELTON ETAL   3,076,175
GEOPHYSICAL EXPLORATION
Filed April 10, 1956                5 Sheets-Sheet 4

Jesse D. Skelton
Philip S. Williams    Inventors
John T. Baker

By W.D. Heilman  Attorney

Jan. 29, 1963 J. D. SKELTON ETAL 3,076,175
GEOPHYSICAL EXPLORATION
Filed April 10, 1956 5 Sheets-Sheet 5

FIG. 7

3,076,175
GEOPHYSICAL EXPLORATION
Jesse D. Skelton, Philip S. Williams, and John T. Baker, Tulsa, Okla., assignors, by mesne assignments, to Jersey Production Research Company
Filed Apr. 10, 1956, Ser. No. 577,345
11 Claims. (Cl. 340—15.5)

The present invention broadly relates to geophysical procedures for determining the presence and location of subterranean strata. It particularly relates to seismic geophysical exploration techniques in which elastic seismic waves are initiated at one point within the earth and are thereafter detected at points within the earth that are removed from the initiation point. The invention especially relates to an apparatus and procedure for preparing a seismic section of the earth in which dipping formations are migrated to reduce errors in their apparent locations and angle of dip.

The application of geophysics in prospecting for mineral deposits is well known and especially in prospecting for oil. In general, geophysical procedures rely on the use of seismic waves which are transmitted into the earth. Wherever these waves encounter discontinuities or reflecting surfaces within the earth, they are at least partially reflected back up to the surface of the earth. By stationing sensitive detectors along the surface of the earth, it is possible to detect the reflected waves and to determine the intervals of time that are required for the waves to travel to the reflecting surface or surfaces and thence to the detectors. Knowing the speed of the waves through the earth and the positions of the detectors relative to the wave initiation point, it is possible to determine the existence and nature of the reflecting surfaces.

In the past it has been conventional practice in the art to generate or initiate seismic waves within the earth by detonating one or more charges of explosive at a point reasonably near the surface of the earth. The explosive may be detonated above or directly on the surface of the earth, but it is generally preferred to detonate it at a point below the "weathered layer." Thus, it is general practice to drill a shot hole through the weathered layer and to place the explosive at one or more points within the hole.

At the same time a plurality of seismic detectors are positioned in any desired pattern in a spaced relationship with the shot hole. Suitable recording apparatus is connected to the detectors and to the electrical circuit or other device for detonating the explosive; and a continuous record of each detector signal is made indicating the intervals of time that are required for the waves to travel from the explosion point to each one of the detectors.

Until recently, substantially all recording apparatus for recording and measuring the travel times required for seismic waves to travel from a shot point via reflecting surfaces to detectors made use of recording devices which generate an oscillographic trace in response to rapidly varying electrical signals. By rapidly moving a suitable recording medium past the recording device, it has been possible to obtain continuous records of the detector signals with respect to elapsed time. Although the records are difficult to analyze and read, it has been possible to learn a great deal about the earth's structure through their use.

Recently, persons skilled in the art have begun to develop and employ seismic recording apparatus in which the records produced are reproducible in that they can be repeatedly played back to generate trains of electrical signals. Illustrative of the types of reproducible records that are contemplated and employed are records such as are described and explained in U.S. Patent No. 2,051,153— Rieber. In this patent Rieber describes a variety of photographic-type records and magnetic-type records, all of which are reproducible and all of which he generically refers to as "phonographic" records.

In the past it has been substantially impracticable to directly utilize reproducible or "phonographic" records; and it has been conventional practice to convert or transcribe these records into the previously mentioned oscillographic-type records before analyzing and evaluating them. Very recently, however, apparatus and techniques have been developed for converting reproducible records directly into visible traces of other than the oscillographic type. More specifically, magnetic traces, variable density traces, variable area traces and the like are reproduced to generate signals which are thereafter employed to directly or indirectly produce visible-type seismic sections which may be completely corrected for dynamic and static type seismic errors. Briefly, each trace of the original traces is reproduced and corrected for static errors including the LVL error, the shot-to-datum error, the geophone-to-datum error and the like as well as dynamic errors such as the spread or step-out error. Each corrected trace is thereafter recorded on a suitable recording medium in proper corrected relation to the other traces. The width of the individual traces in the section may be properly adjusted such that the final seismic section is essentially an accurate vertical cross-section or profile reproduction of the portion of the earth under study.

It has been the particular practice in these recent developments to prepare corrected seismic sections in which the individual section traces are of the variable density photographic type. Sections composed of these traces have proven to be remarkably accurate, faithful and susceptible of direct and ready observation.

Corrected seismic sections may also be prepared from original seismic records of the oscillographic type, but such sections are characterized by several disadvantages. First, the information which is corrected and transcribed from the original records to the seismic sections must be handled manually and individually. Furthermore, the records are necessarily edited to at least some degree, and the original nature and completeness of the records are therefore altered. It is also apparent that this type of procedure requires a great deal of patience and time. Thus, while the present invention has application to records and seismic sections of this type, it is preferably employed in connection with records and sections of the reproducible or phonographic type.

Regardless of type, seismic sections which have been corrected for static and/or dynamic seismic errors are prepared with the assumption that all of the formations and reflecting surfaces depicted in the sections are substantially horizontal. In other words, any formations, reflections or the like that have an angular disposition or dipping relationship within such sections are characteristically illustrated at an incorrect dipping angle and location.

When working with sections in which dipping formations are indicated, it has been conventional practice on the part of persons skilled in the art to mechanically (as by means of suitable drafting instruments), mathematically, or mechanically and mathematically "migrate" the formations into a more correct position and dipping angle. Special drafting instruments have been suggested and developed for semi-manually or manually migrating dipping reflections in a section into corrected positions and angles of dip, but all of these devices have been subject to the same type of disadvantages that characterize the conversion of oscillographic trace records into corrected seismic sections. In other words, the various suggested devices are time consuming in their operation, and they are additionally expensive and do not completely reproduce a record.

Accordingly, it is an object of the present invention to provide an apparatus and procedure for converting seismic sections that contain dipping formations into "migrated" sections in which errors in the locations and the dipping angles of the formations are reduced. As stated earlier, the invention has general application to all types of seismic sections whether they be prepared from original seismic records of the non-reproducible type or the reproducible type. The invention merely requires that the section which is processed be of a character in which reflections, formations and the like are delineated by variations in the intensity or appearance of the record. In other words, the seismic section may be of a magnetic type in which reflections or formations are characterized by variations in the magnetic qualities of the record medium; or it may be of a photographic type in which the photographic density or color of the record medium varies with the presence of reflections; or it may merely be of a type in which reflections and the like are depicted on ordinary paper by means of drafted lines, etc.

Briefly, in accordance with the present invention, a seismic section containing dipping formations is scanned by means of a transducer which is adapted to generate electrical signals in response to variations in the record intensity or appearance of the section. The electrical signals are then employed to actuate a recording device which forms a record on a suitable recording medium which varies in accordance with variations in the electrical signals received.

The transducer which is employed to scan the original seismic section must be of a character such that in scanning the original section it can be adjusted to reproduce substantially selectively only those reflections, formations or the like which exist within the section at a particular apparent angle of dip. Furthermore, the movement of the scanning transducer must be coupled with the movement of the recording device so that, when the transducer is adjusted to reproduce only those reflections or crossings that possess a zero angle of dip, the recording device and the transducer are coupled in a pantographic-type fashion. In other words, all movements of the recording device and the transducer are subtantially proportional under such conditions.

When the scanning transducer is adjusted to reproduce reflections, crossings or the like that possess a dip angle other than zero the recording device is urged to a properly "migrated" position so that the formations or signals recorded on the record medium are positioned in a corrected location and angle of dip.

It should be noted at this point that the invention takes into account several assumptions which may be altered as the occasion requires. Thus, the invention is preferably employed to migrate reflections in seismic sections wherein horizontal measurements and vertical measurements are presented in the same scale. It is further generally assumed that the velocity of sound through the section of earth under investigation is a constant value.

At this point it will be noted that it is a well recognized fact in the art that errors in the position and dip of dipping formations are material and substantial only for those formations which lie at relatively great depths—i.e. of the order of at least about 1000 feet below datum. It will further be noted, however, that any one or all of these assumptions need not be ignored in the practice of the invention if the occasion demands.

The invention may be better understood by reference to the attached drawing in which.

Figure 1:
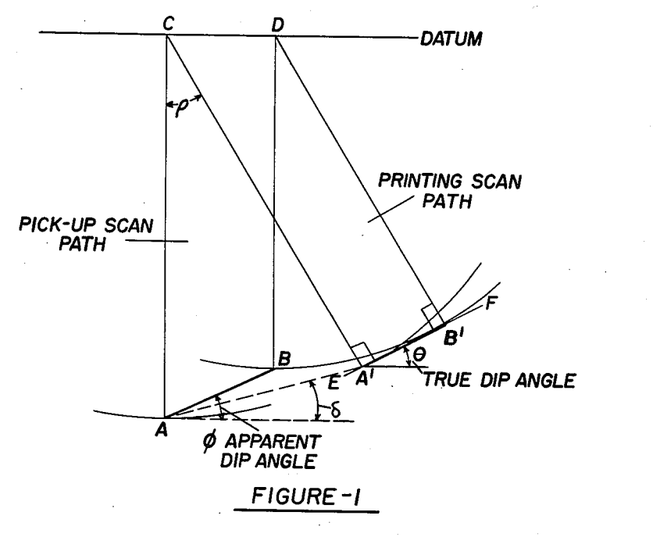
FIGURE 1 illustrates the principles and basic technique for migrating dipping reflections in a seismic section to a corrected location and angle of dip.

Referring now to FIGURE 1, it will be assumed that line AB in this figure is a dipping reflection in a corrected seismic section. It will further be assumed that line AB has an apparent angle of dip $\phi$ and that points C and D lie vertically above points A and B on the datum line corresponding to geophone locations at which points A and B were detected.

Assuming for simplicity that the traces formed by geophones C and D have been spread corrected (i.e. that the shot point and each geophone location are in effect at the same point) and that the profile line lies in the same direction as the direction of dip of line AB, this line is migrated to its correct position in the following manner. First, arcs of circles are drawn through points A and B with points C and D as the centers, respectively, of the two circles. The arcs of the two circles are illustrated in the figure. A line EF is then drawn which is tangential to both circular arcs at points A' and B' respectively. This line represents the proper location of the line AB; and additionally, the distance A'B' is the true length of line AB and lies at the correct dip angle $\theta$.

It will be noted at this point that the migrating technique just described and illustrated in FIGURE 1 is well known to persons skilled in the art and that this information in itself does not constitute a part of the present invention. It will also be noted that certain geometric relationships exist within the figure which are likewise well known to persons skilled in the art. For example, it is well known that the sine function of the dip angle $\theta$ is always equal to the tangent function of the angle $\phi$. It will further be noted that it is conventional in the art to refer to the angle $\theta$ as the true dip angle and to the angle $\phi$ as the apparent dip angle.

In FIGURE 1 it will additionally be observed that any reflection which lies within the area ABDC at the angle $\phi$ will have a correct migrated position which lies within the area A'B'DC at an angle of inclination $\theta$. It is this relationship which is utilized to advantage in the present invention. Thus, a scanning device is moved along the pickup scan path from line AB to the datum (or vice versa) so as to selectively reproduce all reflections which have the apparent dip angle $\phi$. Simultaneously, a printing device is moved relative to a recording medium along the printing scan path which extends from line A'B' to line CD on the datum. By proper coupling and coordination of the two steps, a record is obtained in which all reflections in the pickup scan path having an apparent dip angle $\phi$ are migrated into their correct position and angle of dip. The nature of this operation and the manner in which the operation is carried out by the present invention will become more apparent with the descriptive material which follows.

In connection with the brief outline of the migrating operation which the present invention performs, it will be observed that the pickup scan path in FIGURE 1 has been illustrated to be a vertical path and the printing scan path to be an inclined path. It will be recognized, however, that it is the relative angular dispositions of these two scan paths that is important; and it is just as reasonable to have the printing scan path be in a vertical direction and the pickup scan path to be in an inclined direction. Indeed, for the purposes of the present invention, it is generally preferred that the latter arrangement be followed.

In FIGURE 1, the angle of the printing scan path is designated by the legend ρ. It is of interest, however, that the angle ρ for the migration problem shown in this figure is equal to the angle θ.

Figure 2:
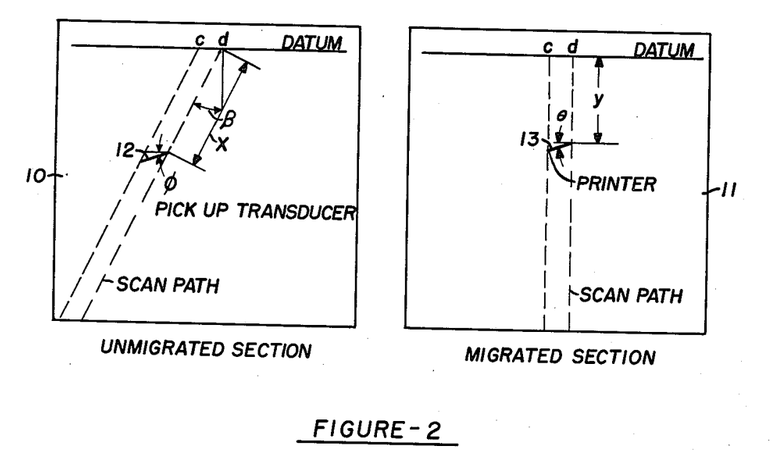
FIGURE 2 illustrates the manner in which the invention simultaneously scans an unmigrated section and records a migrated section.

Turning next to FIGURE 2, there are illustrated in this figure an unmigrated section 10 and a migrated section 11 to depict more clearly the mode of operation of the present invention. It will be noted that the two sections are assumed to be of the variable density type; that they have substantially identical proportions; and that they are aligned such that the datum in each section is in substantially the same position.

In the migrated section 11 there is illustrated a printer 13 which is adapted to move in a vertical scan path from the line CD on the datum downward to the bottom of the section. It will further be noted that printer 13 is angularly inclined at an angle θ, this angle being the angle of true dip as described hereinbefore. Thus, printer 13 in traveling along the illustrated scan path is adapted to print any reflections in the unmigrated section 10 which possess the proper apparent dip angle and location.

Referring next to the unmigrated section 10 in FIGURE 2, there is illustrated a pickup transducer means 12 which is adapted to move along the inclined scan path in synchronism with the movement of the printer 13 along its scan path in section 11. It is apparent, of course, that pickup means 12 must be adapted to reproduce reflections that are inclined at an apparent dip angle φ and that the printer 13 must be adapted to record information at an inclination equal to the true dip angle in order that reflections picked-up by pickup means 12 may reproduce reflections in the unmigrated section 10 which correspond to the reflections which the printer 13 should be printing in section 11. It will further be apparent that the scanning rate of the pickup means 12 must be different than the scanning rate of the printer 13. Specifically, the following relationship must be observed.

$$\frac{\text{Speed of unmigrated scan}}{\text{Speed of migrated scan}} = \frac{\sqrt{1+\sin^2 \theta}}{\cos \theta}$$

The mode of operation of the present invention, still referring to FIGURE 2, is therefore as follows. A true dip angle θ is selected for the inclination for the printer 13, after the unmigrated section and the recording medium for the migrated section 11 have properly been aligned. The selection of this true dip angle automatically fixes the relative path angle and the apparent dip angle φ for the pickup scan. Both scans are initiated along the line cd which are at corresponding horizontal and vertical positions along the datum line of the profile in each section. The printer scans and prints along the indicated vertical path, and the pickup 12 scans along the inclined unmigrated path as shown. Once in operation, pickup 12 must scan at a speed relative to the printer 13 as indicated in the relationship presented earlier. Thus, as the pickup 12 passes by reflections in the unmigrated section 10 which possess an apparent dip angle φ it reproduces such reflections. Then, by means of suitable circuitry or the like, printer 13 records the picked-up reflections in their proper position and dip angle along the vertical scan path in section 11. Preferably, several printing scans for the interval cd are made at different true dip angles with the result that the pickup 12 scans over a plurality of scan paths in the manner illustrated in FIGURE 2.

Figure 3:
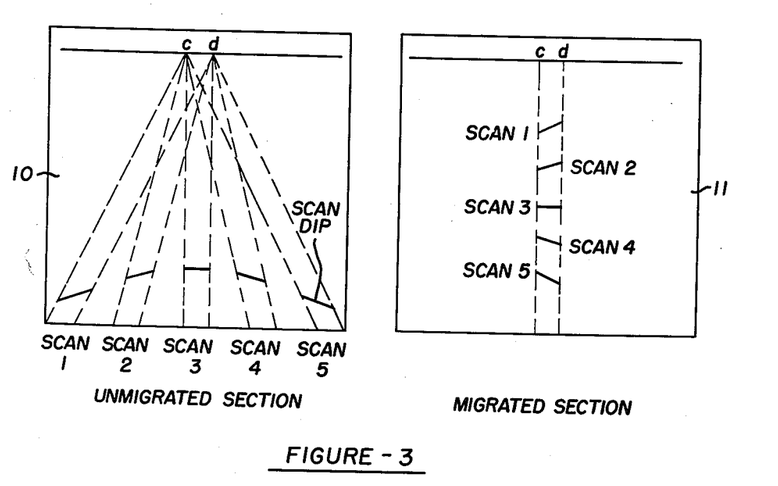
FIGURE 3 is another illustration indicating the relative scan paths that are involved when one element or segment of a migrated section is scanned at different dip angles.

Turning momentarily to FIGURE 3, there are illustrated in the migrated section 11 the true dip angles of five different scans such as might be made for the segment cd. In the same figure, there are illustrated in section 10 the five different scan paths that the pickup device scanning this section would have to follow to correspond to the scans indicated in section 11.

Figure 4:
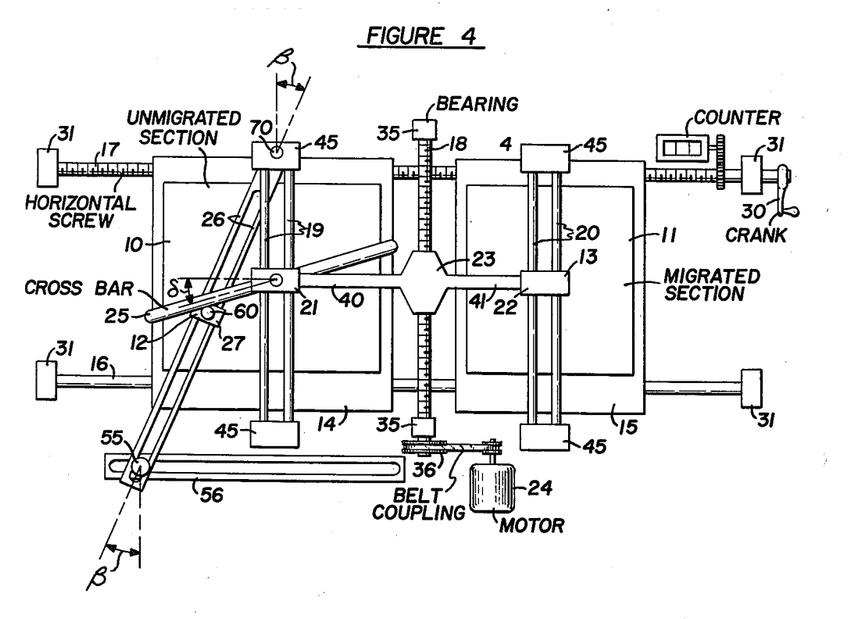
FIGURE 4 illustrates a top view of an apparatus which embodies the principles of the invention.

In a preferred mode of operating the invention, the printer 13 (as will be discussed in greater detail later hereinafter) is a line source of light, and the recording medium forming the migrated section 11 is a photographic or photosensitive film. In this procedure each printing scan of the printer 13 is made at a reduced exposure so that the vertical segment under c and d in FIGURE 4 is a photographic composite of the separate scans at the different apparent dip angles in the unmigrated section 10. The proper number of scans to be made along each vertical scan path in the migrated section to incorporate all of the necessary and vital data from the unmigrated section 10 will be readily apparent. Thus, in FIGURE 4 it will be observed that it would be necessary to run about four additional scans interposed between the indicated scans in order to completely scan the bottom portion of the unmigrated section. It will further be apparent that the number of scans for any given set of seismic records may vary somewhat depending upon the general nature and complexity of the records and of the portion of the earth under study. It will further be apparent that a plurality of scans, similar to the composite scan for segment cd but laterally spaced therefrom, must be made for section 11 in order to provide a complete section.

In converting reflections from an unmigrated section such as 10 in FIGURES 2 and 3 into a migrated section such as section 11 in the same figures, one of two procedures may be employed. First, pickup means 12 may be aligned so as to correspond to the apparent dip angles of readily visible reflections in the unmigrated section, and the printer 13 may then be driven relative to the recording medium for the migrated section to print the scanned reflections in their proper location and angle of dip. Or, alternatively, printer 13 may be positioned at a plurality of dip angles (such as might be predetermined to be the proper dip angles for reflections in the area under study), and the pickup means 12 may then be driven relative to the unmigrated section 10 to detect and reproduce the corresponding reflections. In general, in employing the present invention, the latter procedure is much preferred especially when the migrated section is recorded on a photosensitive film. Control of the quality of the record produced is much superior, and a more intelligible and presentable record is obtained.

Having briefly presented the mode of operation of the present invention, attention is now directed to FIGURE 4 in which there is illustrated an apparatus which embodies the principles of the invention. Attention is also directed at this time to FIGURE 5 which illustrates schematically a preferred type of pickup means for use in the apparatus of FIGURE 4.

In FIGURE 4 it will be observed that the apparatus illustrated includes a section support 14, migrated section support 15, guide rod 16, horizontal screw 17, vertical screw 18, vertical slide rods 19 and 20, vertical slides 21 and 22, yoke 23, drive motor 24, cross bar 25, oblique slide rods 26, oblique slide 27, pickup scanner 12 and printing scanner 13.

Supports 14 and 15 are positioned laterally adjacent one another and are moveably mounted by means of screw 17 and guide rod 16. Both supports are internally threaded to receive screw 17 so that revolution of the screw as by means of crank 30 causes supports 14 and 15 to move along the length of the screw and the guide rod. The screw 17 and the guide rod 16 may conveniently be mounted, as by means of bearings 31, to a suitable stationary base plate. A counter is preferably provided on screw 17 in order to indicate the number of revolutions that the screw experiences. This counter is preferably calibrated so that each revolution of the screw represents or is proportional to a predetermined seismic distance.

An unmigrated seismic section 10 is mounted on support 14, and a suitable record medium 11 is mounted on support 15. As indicated earlier, the unmigrated section may be any one of a wide variety of available and conventional seismic sections, but it is preferred that the section be an assembly of variable density records for reasons that have been given hereinbefore. It is further preferred that this section have been completely corrected for static and/or dynamic seismic errors. It is further preferred that the variable density section be in the form of a photographic positive, although photographic negatives may also be employed. It will be noted that a variable density section consists of a plurality of separate traces arranged in a side-by-side relation, preferably corrected as stated above for static and dynamic (or fixed and variable) seismic errors.

The record medium 11 on support 15 must necessarily be of a type which is responsive to the printing scanner 13. Thus, if the scanner is a recording ink pen, the medium 11 must necessarily be paper or similar material adapted to record the movements of the pen. For the purposes of the present invention, however, it is preferred that the medium 11 be a photosensitive film. The film itself may be supported in a conventional manner on suitable backing materials such as photographic paper or the like.

Positioned immediately above and adjacent the section 10 and the record medium 11 is the portion of the overall apparatus, whose function it is to transpose information from section 10 to medium 11 and to migrate dipping reflections in the process. This portion of the apparatus includes slide rods 19, 20, and 26; vertical slides 21 and 22; cross bar 25; scanner 12; printer 13; yoke 23 and vertical screw 18. All of these components form parts of one integral unit and are independently supported relative to the supports 14 and 15 from a suitable stationary base plate as by means of bearings 35 and blocks 45. Thus, these bearings support screw 18 which in turn supports yoke 23. Yoke 23 in turn supports the various slide members, slides, scanners and associated apparatus. Yoke 23 is internally threaded to receive 18 so that revolutions of the screw cause the yoke to move along the length of the screw. A suitable pulley and belt arrangement 36 supplies rotational movement and power to the screw 18 from the power source 24. Limit switches, reversing mechanisms, and the like are preferably provided with screw 18 to limit vertical movements of the yoke 23 and also to automatically return the yoke to one or the other end of the screw.

As indicated, yoke 23 is provided with two arms 40 and 41 which support vertical slides 21 and 22 respectively. These arms are of a length such that they position scanner 12 and scanner 13 at roughly corresponding points on the section 10 and the record medium 11 respectively. Slide 21 and slide 22 are suitably drilled to receive slide members 19 and 20 and such that sliding movement is possible between the slides and their respective slide rods. The slide rods themselves—i.e., 19, 20 and 26—are supported at each end from the aforementioned stationary base plate by means of suitable supports 45. The upper end of the oblique slide rods 26 is pivotally moveable with respect to the upper end of the slide rods 19 as indicated. The term "upper" with respect to the slide rods and other portions of the apparatus is to be understood in the present description to pertain to those portions of the apparatus which are associated with the upper or shallow portion of the unmigrated section 10 and the migrated section which is eventually produced on the record medium 11.

Pickup scanner 12, which in essence is a transducer capable of generating electrical signals in response to variations in the appearance or intensity of the unmigrated section 10, is adapted to slide along the length of the slide rods 26. The scanner is actually driven along the length of the slide rods 26 from the top of the rods to the lower end of the rods in response to motion of the cross bar 25. Conveniently, a pin 60 or other suitable device is mounted on scanner 12 to slidably engage cross bar 25 so that continuous contact is maintained between the scanner and the cross bar as they travel their respective paths. When the scanner 12 has reached the lower end of its travel on the slide rods 26, it may be returned manually or automatically as by means of a spring or the like to the upper end of the slide rods. Scanner 12 is preferably pivotally mounted on rods 26 so that it can be rotated relative to the axis of the rods. This relationship is desirable, as will be brought out later, when a two-dimensional migration is required.

Cross bar 25 extends across the unmigrated section 10 and is pivotally mounted from vertical slide member 21. It will be observed in FIGURE 4 that cross bar 25 is depicted as lying at an angle with respect to the horizontal. This angular inclination of the cross bar is an adjustable feature, since it is necessary that the angle formed by the cross bar be determined by the degree of migration required. The nature of of this adjustment will be apparent from the following paragraphs.

The lower end of slide rods 26 extends downwardly where it engages a locking pin 55. This pin in turn also engages substantially horizontal slotted bar 56 which is positioned parallel to datum on the section. The locking pin enables the operator to position and lock the slide rods 26 on bar 56 so as to form an angle $\beta$ between the axis of rods 19 and axis of the slide rods 26 which is equal in magnitude to the angle $\beta$ in FIGURE 2. Slotted bar 56 necessarily must be maintained in a stationary position, and it may cvonveniently be secured to the aforementioned base plate.

Figure 5:
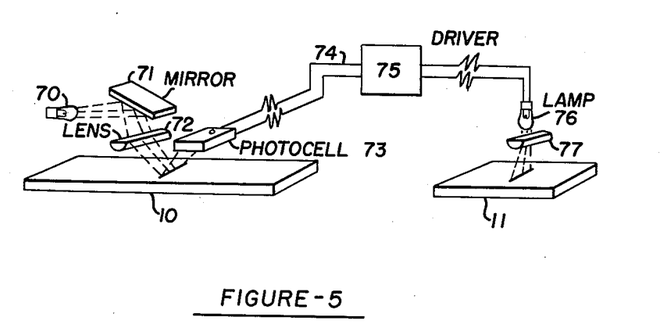
FIGURE 5 is an elevational schematic view of a suitable preferred type of scanning mechanism when the original section and the migrated section are of a variable density photographic type.

As indicated earlier, it is preferred that the unmigrated section 10 be a photographic positive of a variable density type corrected seismic section and that the recording medium 11 be a photosensitive film. With this type of section and record medium, a pickup scanning device such as is illustrated in FIGURE 5 is especially preferred. Referring to this figure, it will be seen that the apparatus shown therein includes the unmigrated section 10, a light source 70, reflecting mirror 71, cylindrical lens 72, photocell 73 and electrical circuit means 74. Additional equipment illustrated are projection lamp 76; cylindrical lens 77 and record medium 11. The reflecting mirror 71 is not critically necessary, but its presence and use are preferred.

Lamp 70, mirror 71 and lens 72 are arranged such that a beam of light emitted by the lamp is reflected by the mirror and focused by the lens as a line-shaped beam on section 10. The beam striking section 10 preferably has a width measurement in the direction of the horizontal with respect to the information on section 10, the width of the beam being greater than its height. Thus, the beam lights up a relatively thin segment of the section. When this illuminated segment is dark in color, a relatively small amount of light is reflected from the section to the photocell 73. Conversely, when the portion of the section is light in color a relatively much greater amount of light is reflected to the photocell. It follows that this characteristic of the system can be used to advantage in the present apparatus. Thus, when the beam of light striking section 10 falls upon a light-colored region (which in variable density positive photographic prints show up as relatively light areas) photocell 73 generates a relatively large electrical signal. This signal is transmitted to a suitable driver 75 to actuate glow tube lamp 76 whose intensity of illumination is a substantially direct function of the signal supplied to the lamp. Light emitted by this lamp is focused by means of lens 77 directly on photosensitive record medium 11 and relative movement between the medium and the lens is provided to form a variable density record. It will be noted that lamp 76 and lens 77 in combination constitute a simple form of printing scanner 13 which may be used in accordance with the present invention to form variable density migrated sections. Angular relationships between the two light projection means and the record medium and the unmigrated section are provided to project the linear light beams on the medium and the section at the desired true and apparent dip angles, respectively.

Since it is desirable to reproduce selectively only certain portions of the unmigrated section 10, as mentioned earlier, it has been found desirable to include a threshold limiter in the driver 75. Such a threshold limiter may use a conventional vacuum tube diode circuit which transmits only those signals greater than a preset value. Many other types of well known circuitry may also be used—for example, a sharp cut triode tube.

Conveniently, the threshold portion of the pickup and printing scanner circuit is adjusted so that it transmits only those signals which come from significant crossings on the section and are large enough to be transmitted by the diode threshold circuit. The nature and identification of significant crossings will be readily apparent to persons skilled in the art, and a simple trial-and-error procedure will suffice to ascertain the optimum setting for the threshold unit. Generally speaking, on records that possess good reflections a high threshold value is employed. Further, in most instances where variable density records or sections are migrated, some 5 to 15 traces are encompassed in each scan.

Since the record medium 11 in the present instance has been considered to be a photosensitive film, it follows that this portion of the apparatus must be enclosed within a light-tight environment. This feature of the apparatus has not been illustrated in the figure, but its nature and construction will be readily apparent to persons skilled in the art.

Having described briefly the nature and structure of the various components of the present invention, attention is now briefly directed to a description of the manner in which the apparatus operates. Thus, an unmigrated section of the variable density type, preferably corrected for static and dynamic errors, is mounted on support 14. A photographic or photosensitive film 11 is likewise mounted on support 15 in a relative position such that all portions of the section 10 to be scanned will be registered on the film 11 in their proper migrated positions when the section 10 has been completely scanned. Expressed otherwise, slides 21 and 22 are positioned relative to section 10 and film 11, respectively, so that they are positioned directly above corresponding portions of the two records. A vertical segment is selected for printing on the film 11 at a predetermined value for the true angle of dip. As explained earlier, a suitable value may be selected by previous knowledge of the dip angles to be expected for the region of the earth under study; or, alternatively, a range of dip angles can be determined by examining the original unmigrated section.

Regardless of the technique employed to determine the true dip angle at which printing scanner 13 is to scan, this scanner and the pickup scanner are adjusted so that they reproduce and re-record reflections at the desired apparent and true angles of dip. Adjustments of these members were discussed earlier in this description with reference to FIGURE 4. It will be noted, of course, that the angular adjustment of the pickup scanner in the apparatus of FIGURE 4 must be made with due allowance for the angular disposition of the oblique rods 26. These rods are inclined at an angle $\beta$ as illustrated in FIGURE 4.

After printing scanner 13 has been adjusted, the position of vertical slide 21 has been automatically fixed. At this point cross bar 25 is positioned and locked at the predetermined angle $\delta$, and rods 26 are positioned and locked at the correct predetermined angle $\beta$ by means of the locking pin 55. The vertical distance from the upper end of slide rods 19 (specifically the pivot point 70) to the pivot point of slide 21 corresponds to the vertical distance $y$ illustrated in the migrated section of FIGURE 2. Pickup scanner 12 is then positioned such that the distance from the pivot point 70 to the scanner corresponds to the distance $x$ in the unmigrated section on FIGURE 2. Cross bar 25 contacts pin 69 and is locked in this position as stated above by suitable means associated with vertical slide 21. Thus, a relationship is set up involving slides 26 and 19 and cross bar 25 which constitutes an analog device for automatically migrating reflections on section 10 to their proper position and dip angle on film 11. Motor 24 is stated and the two scanners 12 and 13 are automatically and simultaneously driven along the slide rods 19 and 20 respectively.

As pickup scanner 12 moves downward along slide rods 26 it illuminates segments of the unmigrated section and generates electrical signals in response to the degree of illumination reflected from the surface of the section. These electrical signals are transmitted to the printing scanner where they cause a photographic record to be made on film 11.

In general it is contemplated that a plurality of scans should be made for each vertical segment of the film 11— each successive scan being made at a different dip or scan angle. The range of dip angles can be varied according to the dip angles that characterize the portion of the earth under study. Necessarily, the relative positions of the pickup scanner 12, the cross bar 25 and slide rods 26 will vary depending upon the angle of dip scanned.

Having completed the scanning operations for one vertical segment of film 11, crank 33 may be turned thereby moving a different, preferably adjacent, vertical segment of film 11 in alignment with the scan of printer 13. Simultaneously, vertical slide 21 is moved to a point on section 10 which corresponds to the position of slide 22 on film 11, and the scanning operations and adjustments described above are repeated. By repeating all of the described operations, a complete record may be formed on film 11 corresponding to the data in section 10.

It will be observed in FIGURE 4 that film 11 is shown as being narrower in width than section 10. The reason for this difference in width will be apparent to those skilled in the art when it is appreciated that reflections taken from section 10 are removed from their proper position. When they are migrated and incorporated within the correct or migrated section on film 11, the entire record necessarily appears to be compressed, even though the unmigrated and migrated sections are actually proportional or equal to one another.

At this point it will be noted that the foregoing description has been concerned with merely one preferred structural embodiment of the invention. It will be apparent that numerous modifications may be incorporated within the apparatus without departing from the spirit or scope of the invention. Thus, the unmigrated section and the record medium may vary over a wide range of suitable materials as pointed out earlier in this description. Similarly, the support members 14 and 15 may be superimposed rather than positioned side-by-side as illustrated in FIGURE 4. The mechanical adaptations necessary to attain such an arrangement will be readily apparent to those skilled in the art. Further, pickup scanner 12 may be a magnetic head when the unmigrated section 10 consists of magnetic records; and printing scanner 13 may be a recording pen, magnetic head or the like when records other than photographic are desired.

Figure 7:
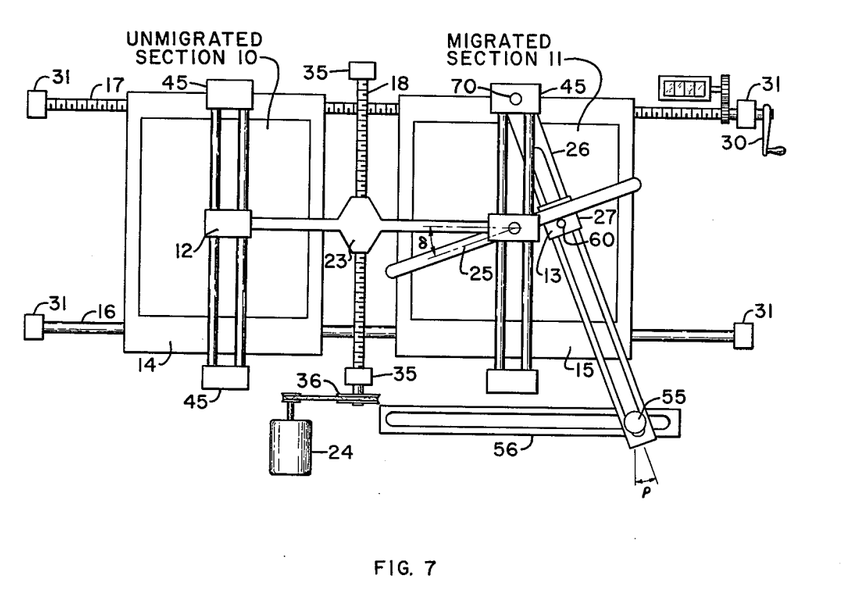
FIGURE 7 is a top view of another apparatus which embodies the principles of the invention.

Another apparatus embodiment of the invention employing the migration system shown in FIGURE 1 is illustrated in FIGURE 7. This embodiment uses the same structural members as those shown in FIGURE 4— rearranged, however, to have its printing scan path at an angle $\rho$ rather than vertical as was the case in the apparatus of FIGURE 4. Also, the pickup scan path in FIGURE 7 is always vertical rather than at an angle $\beta$ as in FIGURE 4. As in FIGURE 4, cross bar 25 is inclined at angle $\delta$, and it rides against pin 60 which is now associated with printing scanner 13 rather than pickup scanner 12.

As mentioned earlier in this description, it was assumed for the sake of the present discussion that the migration involved was one in which the original records were obtained by shooting directly in the same direction as the dipping formations whose reflections were to be migrated. In other words, it was assumed that up- and/or down-dip shooting was employed. It will be recognized, however, that the invention has ready application to those situations in which the original records are obtained by arranging the seismic detectors in shooting patterns that lie at an angle with respect to the direction of the dipping formations. The adjustments or settings that must be made on the migrator shown in FIGURE 4 for either type of migration problem are indicated in the following table along with the mathematical relationship for ascertaining their values. The terms, it will be seen, are consistent with the legends that are employed in the figures and also elsewhere in this description.

(1) Angular setting of pickup scanner=$\phi$ (apparent dip)

(2) Angular setting of printing scanner=$\theta$ (true dip)

$$\tan \theta = \frac{\tan \phi \sin \alpha}{\sqrt{\sin^2 \alpha - \tan^2 \phi}}$$

(3) Angle of pickup scan path =$\beta$ $$\tan \beta = \frac{\tan \phi}{\sin^2 \alpha}$$

(4) Angle of cross bar=$\delta$ $$\tan \delta = \frac{\sin \alpha (\sin \alpha - \sqrt{\sin^2 \alpha - \tan^2 \phi})}{\tan \theta}$$

(5) Angle between strike and profile=$\alpha$
(6) Angle of printing scan path=

$$\cos \rho = \frac{\sqrt{\sin^2 \alpha - \tan^2 \phi}}{\sin \alpha}$$

It will be apparent that the relationships above simplify greatly when a profile is shot normal to the strike—i.e. in the same direction as the direction of dip. It will equally be apparent that cross-spread shooting or other well known means may be used to ascertain the angle between strike and profile and the profile is shot in a direction other than that of the dip.

Figure 6:
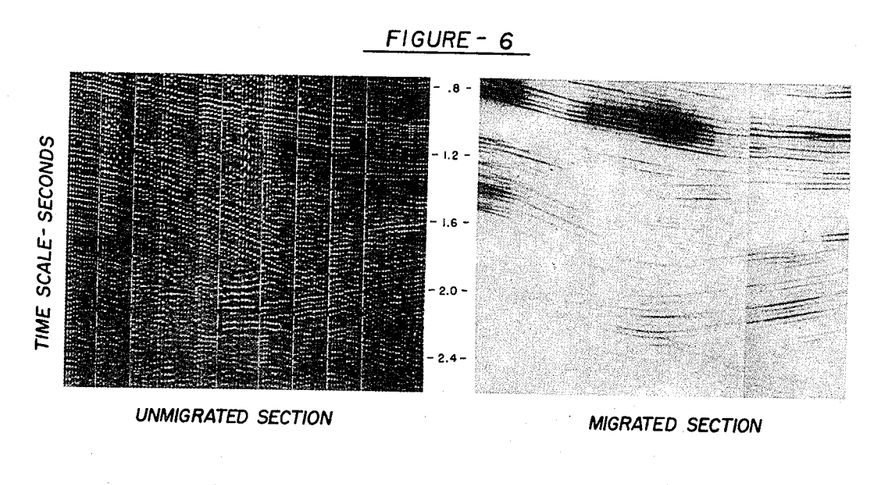
FIGURE 6 illustrates the type of records that can be processed and obtained by application of the invention.

FIGURE 6 illustrates the effect of "migrating" a corrected variable density seismic section or profile in accordance with the present invention. The "unmigrated" section at the left in the figure consists of 120 or more separate traces which have been arranged in the same lateral positions as the geophones corresponding to the traces; and each trace has been corrected to a common datum for static errors and spread errors. A time scale between the two section presentations indicates time on the traces—referred to zero time at datum.

Of particular interest in the "unmigrated" section is the lower right-hand portion of the section corresponding to about 2 seconds on the time scale. Here two formations appear to intersect one another—an illusion caused by the dipping nature of the formations. The illusion is dispelled and a more accurate representation of the formations is afforded in the center portion of the "migrated" section in the figure. Here it is readily apparent that the two formations in question actually constitute a faulted syncline—information which is generally of great importance in prospecting for petroleum.

What is claimed is:

1. An apparatus for reproducing and re-recording a reproducible multi-trace corrected seismic section which comprises: a first support member having a longitudinal dimension and adapted to support said section with the traces in longitudinal alignment with said support member, a pickup scanner adapted to scan a plurality of traces in said section, means to effect straight-line movement between said pickup scanner and said first support member so as to generate electrical signals in response to intensity variations in the section thereon, a second support member having a longitudinal dimension and adapted to support a recording medium, a printing scanner responsive to signals generated by said pickup scanner, means to effect straight-line movement between said printing scanner and said medium and in synchronism with movement between said pickup scanner and its support member to make a trace record of said signals on the medium, said pickup scanner and said first support member being angularly adjustable relative to one another, said printing scanner and said second support member being angularly adjustable relative to one another, the movement between one of said scanners and its respective support member being parallel to the longitudinal dimension of the support member, the movement between the other of said scanners being inclinable relative to the longitudinal dimension of its respective support member.

2. An apparatus for reproducing and re-recording a corrected multi-trace reproducible seismic section which comprises: a first support member adapted to support said section with its trace in alignment with the length dimension of said member, a pickup scanner adapted to scan a plurality of the traces in said section simultaneously and to generate electrical signals in response to intensity variations in said section, said pickup scanner and said first support member being laterally displaceable and movable in a straight line relative to one another, a second support member adapted to support a recording medium in longitudinal alignment therewith, a printing scanner responsive to said signals, said printing scanner and said second support member being laterally displaceable and movable in a straight line relative to one another to form a trace recording of said signals on said medium, said pickup scanner and said first support member being angularly adjustable relative to one another, said printing scanner and said second support member being angularly adjustable relative to one another, the movement between one of said scanners and its respective support member being parallel to the longitudinal dimension of the support member, the movement between the other scanner and its respective support member being adjustable in rate and angularly adjustable relative to the longitudinal dimension of its respective support member.

3. An apparatus for reproducing and re-recording a corrected seismic section consisting of a multiplicity of reproducible side-by-side traces which comprises: a pickup scanner angularly adjustable relative to said section and adapted to scan the section in a straight path, the width of said path being equivalent to the width of a plurality of said traces, a recording medium, a printing scanner angularly adjustable and movable in a straight path along the length of said medium in synchronism with movement of said pickup scanner, said section and said medium being laterally displaceable relative to said pickup scanner and said printing scanner respectively, the scan path of said printing scanner being parallel to the length of said medium, the scan path of said pickup scanner being angularly adjustable relative to the length of said section, said printing scanner being responsive to signals picked up by said pickup scanner to record said signals on said medium.

4. An apparatus for reproducing and re-recording a corrected multi-trace reproducible seismic section which comprises: a pickup scanner adapted to scan a plurality of said traces and movable along a scan path which is angularly adjustable relative to said traces, said pickup scanner being angularly adjustable relative to said section and of a character to generate electrical signals in response to variations in the intensity of said section, a recording medium, a printing scanner responsive to said signals and movable along said medium in synchronism with the movement of said pickup scanner to record said signals as a trace on the medium, said printing scanner being angularly adjustable relative to said medium, said section and said medium being laterally displaceable relative to said pickup scanner and said printing scanner, respectively.

5. An apparatus for reproducing a corrected seismic section wherein the section comprises a plurality of reproducible traces arranged in a side-by-side relation, which comprises a transducer adapted to reproduce a line-shaped segment of said section extending across a plurality of said traces, said transducer being angularly adjustable so as to incline said segment relative to said traces, means to effect a scanning movement between said transducer and said section, the path of said scan being angularly adjustable relative to said traces, a recording medium, a recording device operable to record a trace along said medium in response to signals received from said transducer, said recorded trace having a width corresponding to the extent of said segment and comprising a plurality of segments successively reproduced from said section, and means to incline the segments recorded on said medium in the process of recording, said transducer and said section being laterally displaceable relative to one another, said recording device and said recording medium being laterally displaceable relative to one another.

6. An apparatus as defined in claim 5 in which the scanning device includes a light source adapted to direct a line-shaped beam of light against the seismic section and a photosensitive device responsive to variations in the amount of light unabsorbed by said section, and said recording device includes a light source and means to vary the intensity of the light therefrom in response to signals from said photosensitive device.

7. An apparatus for preparing a variable-density seismic section from a corrected variable-density section which comprises: a pickup scanner adapted to scan the corrected section, said pickup scanner including a light source adapted to impinge a line-shaped light beam on the section and a photo-transducer adapted to generate electrical signals in response to variations in the proportion of the impinged light beam which is not absorbed by the section, said pickup scanner being angularly adjustable to incline its beam of light relative to said section, a photographic film, a printing scanner movable along the length of said film and adapted to photographically expose the film with a line-shaped beam of light, said printing scanner being angularly adjustable to incline its beam of light relative to the length of said film, means to vary the intensity of the beam of light from the printing scanner in response to signals generated by said photo-transducer, means to move said printing scanner and said pickup scanner in synchronism along said medium and said section, respectively, the movement of said printing scanner being parallel to the length of said recording medium, the movement of the pickup scanner being angularly adjustable relative to the length of said section, said pickup scanner being displaceable laterally relative to said section, said printing scanner being displaceable laterally relative to said film.

8. An apparatus as defined in claim 7 including a threshold limiter to transmit only those signals generated by the photo-transducer which exceed a predetermined value.

9. The method of reproducing and re-recording a multitrace reproducible seismic section wherein the traces have been corrected to a datum line extending across the section, which comprises: sequentially scanning the section along straight scan paths extending from said datum line to generate electrical signals varying in magnitude in response to variations in the information recorded on the section, each scan path consisting in essence of a plurality of successive linear elements, angularly adjusting the linear elements in each scan path relative to said datum line to correspond to an apparent dip angle for said section, re-recording the signals from each scan of the section along a straight scan path on a recording medium extending from a preselected datum line extending across the medium, each scan path on said medium consisting in essence of successive reproduced linear elements from said section, angularly adjusting the elements in each scan path on the medium relative to the datum line of the medium to the true angle of dip corresponding to the apparent angle of dip of the linear elements in the corresponding scan path on the section, maintaining all of the scan paths extending from one of said datum lines normal to that datum line, adjusting the angle of the scan paths extending from the other datum line such that the linear elements in each scan path of the section are migrated to a corrected position in the section as it is re-recorded on the recording medium.

10. A method of reproducing and re-recording a multitrace reproducible seismic section in which the traces have been corrected to a time datum line extending across the section, which comprises: reproducing the section in successive straight scan paths extending from the datum line to generate electrical signals variable in magnitude in response to information variations in said section, each scan path being equal in width to a plurality of said traces, adjusting the leading edge of each scan path angularly relative to said datum line to lie at a predetermined apparent angle of dip within said section, re-recording the signals generated from each scan of the section as a straight scan path on a recording medium and extending from a preselected datum line extending across the medium, each scan path on the medium being normal to the datum line of the medium, adjusting the leading edge of each scan path on the medium angularly relative to the medium datum line to lie at a true angle of dip corresponding to the apparent angle of dip of the leading edge of the corresponding scan path in the section, adjusting the angle of each scan path extending from the datum line of the section to effect a continuous migration from the leading edge of the scan path on the seismic section to the leading edge of the scan path on the recording medium.

11. A method as defined in claim 10 in which the seismic section is variable-density in character, the recording medium is a photographic film, and the signals recorded on the film are recorded in variable-density form.

References Cited in the file of this patent

UNITED STATES PATENTS

| | | |
|---|---|---|
| 982,608 | Klenk | Jan. 24, 1911 |
| 2,225,915 | Losier | Dec. 24, 1940 |
| 2,427,421 | Rieber | Sept. 16, 1947 |
| 2,733,510 | Darago | Feb. 7, 1956 |
| 2,821,892 | Merten | Feb. 4, 1958 |